United States Patent [19]

Chandler

[11] 4,175,251
[45] Nov. 20, 1979

[54] NUCLEAR MAGNETISM LOGGING METHOD AND SYSTEM

[75] Inventor: Richard N. Chandler, Danbury, Conn.

[73] Assignee: Schlumberger Technology Corporation

[21] Appl. No.: 898,275

[22] Filed: Apr. 20, 1978

[51] Int. Cl.$^2$ ............................................. G01R 33/08
[52] U.S. Cl. ...................................... 324/303; 324/322
[58] Field of Search ........................... 324/0.5 R, 0.5 G

[56] References Cited

U.S. PATENT DOCUMENTS

| | | | |
|---|---|---|---|
| 3,268,800 | 8/1966 | Hoehn, Jr. .......................... | 324/0.5 G |
| 3,395,337 | 7/1958 | Varian ................................ | 324/0.5 G |
| 4,012,712 | 3/1977 | Nelligan ............................. | 324/0.5 G |

*Primary Examiner*—M. Tokar

[57] ABSTRACT

A nuclear magnetism logging system and method is disclosed in which a surface unit provides power to, control of, and signal reception from a downhole sonde. The surface unit comprises a source of alternating current power and switching circuit means for applying a sequence of alternating current waveforms from the alternating current power source to a surface transformer, each waveform in the sequence starting and stopping with substantially zero amplitude. The switching circuit means memorizes the starting and stopping polarity of the immediately preceding waveform in the sequence, and starts and stops the present waveform in the sequence of waveforms with polarities opposite that of the memorized starting and stopping polarities of the immediately preceding waveform in the sequence. The downhole sonde of the system has a transformer, the primary coil of which is electrically connected to the secondary coil of the surface transformer. A rectifier circuit is connected to a polarizing-receiving coil during the polarizing time of the polarizing-receive cycle. A receiving amplifier is connected to the polarizing-receiving coil during the receiving time of the polarizing-receive cycle. Receiver and recording circuits in the surface unit receive and record the downhole signals from the receiving amplifier. Timing circuitry controls a downhole switching circuit means for alternating the connection of the polarizing-receive coil to the rectifier and the receiving amplifier.

12 Claims, 9 Drawing Figures

NUCLEAR MAGNETISM LOGGING METHOD AND SYSTEM

BACKGROUND OF THE INVENTION

1. Field of the Invention

The invention relates to oil well logging apparatus known as nuclear magnetism logging equipment requiring periodic high-power transmissions with an extremely short duty cycle from surface sources of alternating current power to downhole polarizing coils.

2. Description of Prior Art

Nuclear magnetism logging equipment comprises surface control apparatus and downhole apparatus in a sonde. The sonde and surface apparatus are in electrical communication by means of electrical cables. Alternating current, generated in the surface apparatus, is applied via a cable to the sonde apparatus where it is rectified and applied to a coil, producing a magnetic field in the borehole and formation. This field, called the "polarizing field," serves to polarize the alignment of protons in water, oil and gas. After the polarizing current has been applied long enough to build up adequate polarization, the current is rapidly removed, leaving the protons to precess in the earth's magnetic field and, in so doing, to induce a damped sinusoidal signal in the same coil used to induce the polarization. The signal has a frequency of about two thousand hertz. The signal is damped with a time constant that is frequently about 50 milliseconds, the decay time depending on various factors.

During the signal-receiving time, the coil is connected to an amplifier and the signal sent to the surface apparatus via an electrical lead. At the surface, the signal can be displayed in various ways. In particular, the signal amplitude can be recorded on the log as an indication of the amount of hydrogen in formation fuilds in the reservoir rocks. The signal has several characteristics that can be observed and interpreted. Examples of these characteristics are signal amplitude, signal decay time and the relationship between signal amplitude and polarizing time. The induced signal amplitude, at the instant precession begins, is directly proportional to the number of protons per unit rock volume in the water, oil and gas in the vicinity of the borehole. However, the transition from the removal of the polarizing field to signal receiving takes a finite amount of time, and a time delay occurs before the signal may be observed.

The operational requirements of the downhole apparatus cause severe specifications for the surface power generation and transmission circuits to the downhole equipment. Because of the low signal level of the precessing protons, alternating-current power transmission to the sonde must terminate during the signal-receiving time.

At each depth location of the sonde, one measurement requires a relatively long time for polarization ad signal reception. It is necessary to perform the polarizing-signal reception cycle as often as possible in order to maximize the number of received signals, yet minimize the time the sonde is in the borehole. Power transmissions are required for extremely short duty cycles, occasionally as short as 100 milliseconds.

These requirements put severe electrical requirements on the surface electrical generating equipment when turned on and off with extremely short duty cycles to magnetic loads. Operation of a nuclear magnetism logging system with short duty cycle switching of alternating current generators to iron-core transformers causes extremely high current surges which must be supplied by the generator.

Prior art apparatus and methods for switching alternating power sources to iron-core transformer loads have recognized the benefit of opening and closing a switch between the load and the source at a zero amplitude point of the alternating current waveform. Switching at a time when the current through the transformer is zero helps to eliminate high current transients through the transformer. Early prior art power switches have used a simple zero crossing mechanism which opens and closes as the alternating current waveform crosses zero.

Later refinements to the zero crossing switches art have seen the addition of means for storing information regarding the turnoff polarity of the previous alternating current waveforms. These switches insure that the source of alternating power is connected to the magnetic load with a polarity opposite that of the previous disconnect polarity. For example, the prior art "zero crossing switches with memory" typically disconnect the power source at a zero amplitude point after a negative half-cycle, and apply the current waveform for the next transmission at zero amplitude, but at the point before the positive-going half-cycle of the alternating waveform. These prior art switches typically turn on with the same polarity for each power transmission and turn off each time with a polarity opposite the turn-on polarity. The zero crossing switches described above are manufactured commercially by the Hamlin Corporation and the Crydom Company. These switches are described in technical literature published by the Hamlin Electronics Inc., Lake and Grove Sts., Lake Mills, Wis. and by the Crydom Division of International Rectifier, 1521 Grand Ave., El Segundo, Calif.

These prior art switches function in a satisfactory manner when the transmission duty cycle is relatively long (e.g., the time during which the power source is connected to the magnetic load is long compared with the transient time associated with the iron-core transformer). Transformer transient time is the time required for the transformer to reach steady state voltage and current conditions after power is applied to it from a transformer level of magnetization remaining when it was previously turned off. These prior art switches typically cause extremely high transformer current surges which must be supplied by the power source when the duty cycle time of applying the power to the iron-core transformer is short compared with the transformer transient time.

It is an object of this invention to provide a nuclear magnetism logging system having power switching circuitry capable of providing power transmissions for extremely short duty cycles, as short as 100 milliseconds.

It is another object of this invention to provide nuclear magnetism logging apparatus and methods for switching a surface source of alternating current power to a downhole sonde while minimizing the transient current surge requirements of an ironcore transformer under short duty cycle conditions.

SUMMARY OF THE INVENTION

These objects are realized in the method and apparatus of this invention by providing a nuclear magnetism logging system having downhole polarizing and signal receiving equipment and surface apparatus for control, electrical power generation and signal reception and recording. The surface equipment comprises means for switching the generator source of alternating waveforms to a transformer load in the power transmission circuit to the downhole apparatus. The switching means applies sequences of the generated alternating current waveforms to the transformer load by applying the present waveform to the load with a starting polarity opposite to the stopping polarity of the immediately preceding waveform and disconnecting the generator from the load only after an odd number of half-cycles of the waveform have been applied. Application of the present waveform for an odd number of half-cycles insures that the stopping polarity of the present waveform is opposite in polarity to the stopping polarity of the preceding waveform.

The switching circuit means comprises a memory circuit in the form of a flip-flop which is used to memorize the stopping polarity of the preceding waveform in the sequence. A circuit responsive to a waveform enable signal compares the memorized stopping polarity of the preceding waveform with the polarity of the present alternating waveform. If the polarity of the present waveform is the same as the previous waveform stopping polarity, a control signal is generated and applied to a zero crossing switch which applies the alternating waveform to the load when the waveform passes through zero amplitude to a polarity opposite that of the preceding waveform stopping polarity. When the waveform enable signal is removed, the circuit compares the memorized stopping polarity of the preceding waveform with the current waveform polarity. Once these polarities are opposite, the control signal is removed. Removal of the control signal causes the zero crossing switch to disconnect the waveform from the load when the waveform passes through zero amplitude from a polarity opposite that of the previous waveform stopping polarity.

The downhole polarizing and receiving equipment of the system has a transformer, the primary coil of which is electrically connected to the secondary coil of the surface transformer. A rectifier circuit is connected to the polarizing-receiving coil during the polarizing time of the polarizing-receive cycle. A receiving amplifier is connected to the polarizing-receiving coil during the receiving time of the polarizing-receive cycle. Receiver and recording circuits in the surface unit receive and record the downhold signals from the receiving amplifier. Timing circuitry controls a downhole switching circuit means for alternating the connection of the polarizing-receive coil to the rectifier and to the receiving amplifier.

DESCRIPTION OF THE INVENTION

Figure 1:
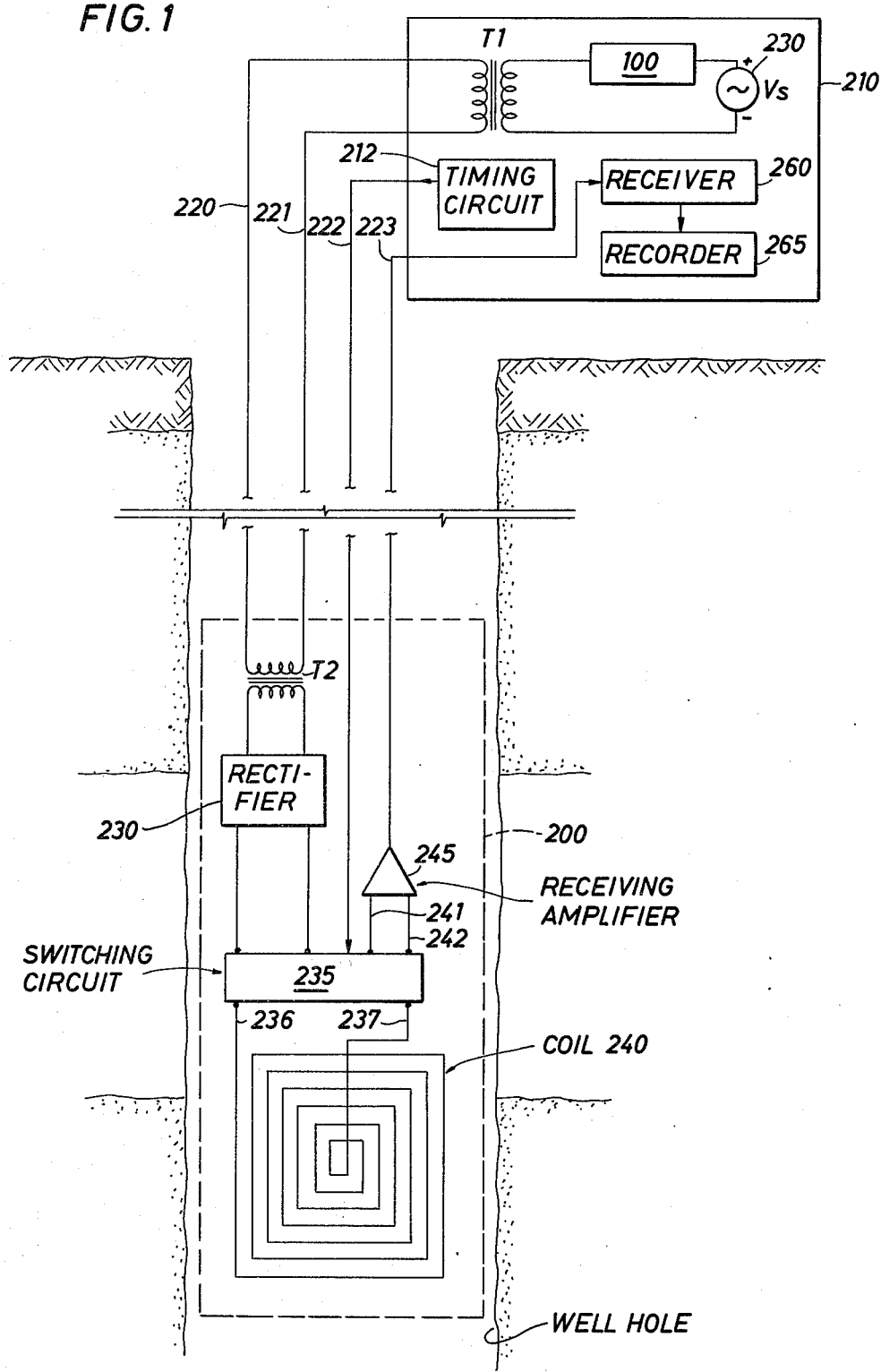
FIG. 1 illustrates components in the nuclear magnetic logging system of the invention.

FIG. 1 illustrates the nuclear magnetism logging system of this invention. Downhole apparatus of the system is housed in a sonde 200. Surface apparatus may be contained in a suitable housing 210 which may be a service truck, offshore unit, or the like. Electrical communication between housing 210 and sonde 200 is shown schematically as conductors 220-223. Other conductors and cables, well known in the well logging art, are not shown, in order that the invention may be illustrated with simplicity.

Power from a source of alternating current power 230 is applied to transformer T1 via switch 100. Transformer alternating current (A.C.) is applied to a downhole transformer T2 in sonde 200. Output current of transformer T2 is applied to rectifier 230 where the A.C. waveform is rectified as a D.C. polarizing current for polarizing coil 240. Switching circuit 235 is controlled by sonde switching circuit 235 from surface timing circuit 212 via lead 222. Timing circuit 212 causes the switching circuit to connect the output of rectifier 230 to coil leads 236, 237 during the polarizing period, and to connect the input leads 241, 242 of signal receiving amplifier 245 to the coil leads 236, 237 during the signal-receiving period. Output of signal receiving amplifier 245 is transmitted via lead 223 to receiver 2601. Information from receiver 260 may be recorded in recorder 265.

Figure 2:
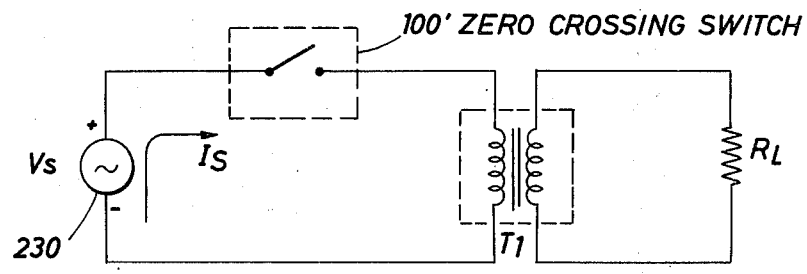
FIG. 2 shows a simplified electrical schematic drawing illustrating a prior art zero crossing switch between an ironcore transformer with a load of a downhole nuclear magnetic logging system and a source of alternating current voltge.

FIG. 2 illustrates a prior art switching apparatus 100' connected between the source of alternating current power 230 and a transformer T1 where the downhole apparatus is represented schematically as a load RL connected to the secondary of transformer T1.

Figure 4:
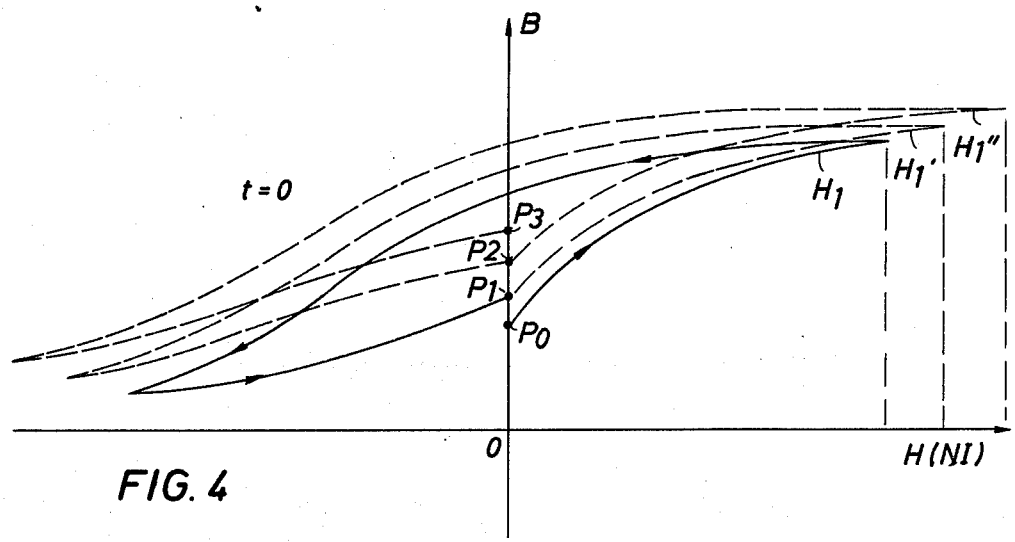
FIG. 4 illustrates, with the aid of hysteresis loops of an iron-core transformer, how current surges can increase when an iron-core transformer is energized with alternating current for duty-cycles short compared to the time required for the transformer to reach steady state conditions.
Figure 3:
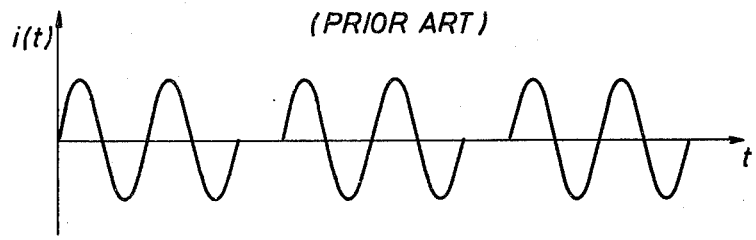
FIG. 3 illustrates alternating current waveforms applied by prior art zero crossing switch apparatus.

FIG. 3 illustrates the waveform sequence produced by prior art switching apparatus 100' of FIG. 2 for application of an alternating waveform to a iron-core transformer load. The waveform is typically started with the positive half-cycle and stopped after a negative half-cycle. One way to specify this prior art sequence is that there must be an even number of half-cycles of the waveform for each sequence. The result of applying this type of waveform sequence, as described below, is to force the residual magnetization point up the B axis of the B-H axes, with the result that higher and higher H surges (or current turn or simply current surges) are called for when the duty cycle is sufficiently short where the iron-core transformer is prohibited from returning to steady state operation. These prior art switches are provided with a memory circuit to insure that the alternating waveform is always applied to the load in exactly the same phase conditions. FIG. 4 may be used to understand how large current transients can result when application time of the alternating current to the iron-core transformer is short.

In FIG. 4, an illustrative B-H curve is presented with the assumption that the residual magnetism of the iron-core transformer places its state on the B-H curve at point $P_o$. A positive application of current forces the transformer to be cycled along hysteresis curve H1. For simplicity od illustration, it will be assumed that only one cycle (an even number of half-cycles) of the waveform is applied to the transformer. A one-cycle application of power via the prior art switch causes the voltage source to be connected at zero amplitude on the positive-going half-cycle and causes the voltage source to be disconnected at zero amplitude after the negative half-cycle. The residual magnetism at point P1 via hysteresis loop H1 may be greater than the original magnetism $P_o$. A subsequent one cycle current waveform causes the transformer to be cycled from P1 along curve H1' to point P2. A subsequent one cycle application with the prior art switch causes operation along hysteresis loop H" to point P3.

The resulting residual magnetism P3 exceeds the previous residual magnetism P2; the net effect after several short duty cycle applications of power is that the residual magnetism has increased along the B axis until the transformer iron is excessively saturated. Although the increase of residual magnetism has been demonstrated here with duty cycles as short as one cycle, the same effect occurs with duty cycles as short as 6 to 10 cycles of voltage waveform (i.e., 100–160 milliseconds duty cycles of 60Hz sinusoidal voltage). It is clear that the simple zero crossing switch may result in transients of increasingly large current surges, which place intolerable demands on the power source.

Laboratory experience confirms the theoretical explanation of the transient behavior of a prior art "zero crossing switch with memory" connecting a source of alternating current voltage to an iron-core transformer. These transients are so severe that the conventional switching devices are practically unusable when used in a short duty cycle application. The load demands on the alternating current power supply become excessively severe.

Figure 5:
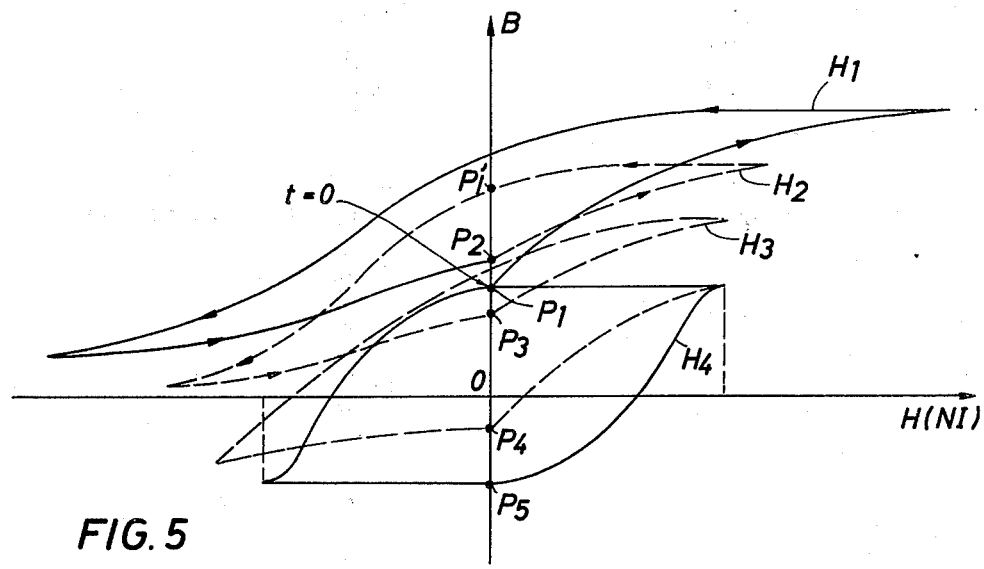
FIG. 5 illustrates by means of a series of hysteresis loops on B-H axes how an iron-core transformer reaches steady state conditions after being energized with alternating current from a state of initial magnetization.

Prior art switches illustrated in FIGS. 2 and 3 perform satisfactorily where sufficient time exists for the iron-core transformer to reach steady state condition. FIG. 5 illustrates a family of hysteresis curves which exist during the transient turn-on phase of the transformer T1 illustrated in FIG. 2. An example of the transient-to-steady state operation of the iron-core transformer T1 can be demonstrated with reference to FIG. 5 in which the residual magnetism point P1 indicates the level of positive residual magnetism existing in an iron-core transformer prior to application of power source Vs. Application of a positive going sinusoidal voltage causes current to surge because of the low iron-core reluctance in the positive direction of the magnetization axis H. During the negative half-cycle of the alternating current, the iron-core hysteresis loop follows curve H1. Subsequent waveform cycles follow hysteresis curves H2 and H3, each approaching steady state hysteresis loop H4, which is symmetrical about the origin of the B-H axes. Steady state operation of loop H4 insures that the maximum current amplitude demands of the source Vs are limited to the extremes of the steady state hysteresis loop H4. As demonstrated previously when the application time of the alternating current is not sufficiently long (e.g., a few seconds) for the magnetic circuit to reach steady state conditions, increasingly large current transients can result.

Figure 6:
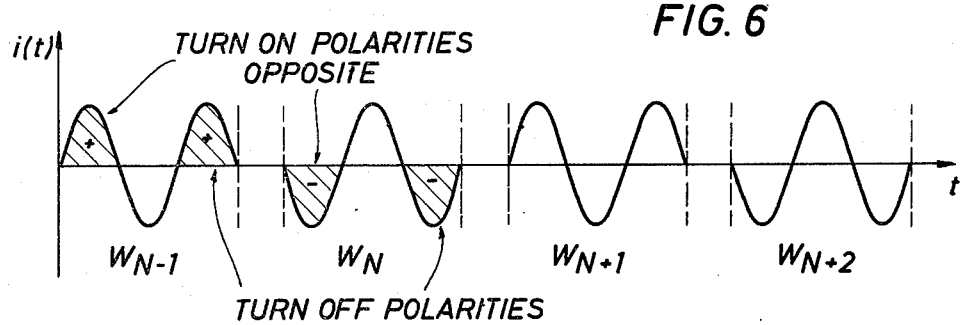
FIG. 6 illustrates sequences of alternating current waveforms applied by the methods and apparatus of this invention.

FIG. 6 illustrates the applied current waveform generated by the switching apparatus portion of the nuclear magnetic logging system of this invention. The current waveform applied to the load by the apparatus of this invention insures that the turn-on polarity of the waveform is opposite that of the turn-on polarity of the immediately preceding waveform, and that the turn-off polarity is opposite that of the turn-off polarity of the immediately preceding waveform. The apparatus incorporates a zero crossing switch so that the current waveform is applied and removed from the iron-core transformer at substantially zero amplitudes.

the effect on the transient operation of the iron-core transformer can be assessed by again referring to FIG. 5. It is assume, as before, that residual magnetism in the iron-core causes initial operation to begin at point P1 on the B axis. A positive and negative application of the applied waveform (e.g., beginning at the start of waveform $W_{N-1}$ of FIG. 6) brings the B-H curve to point P2. The remaining half-cycle of the applied waveform brings the curve to point P1', at which time the applied waveform is removed. When the waveform is reapplied to the transformer (e.g., with the waveform $W_N$ of FIG. 6), operation commences at point P1' in a negative-going manner. Operation along the transient B-H curve of the iron-core transformer is along the hysteresis loop labeled H2 to point P3 and then along loop H3 until the waveform is removed at point P4. The effect of applying alternating current waveforms to the iron-core transformer in the manner illustrated in FIG. 6 causes operation along the transient hysteresis curves to approach the steady state loop (e.g., loop H4 of FIG. 5) even while turning the applied waveform on and off to the iron-core transformer load. The transient currents generated by applying the waveforms to the iron-core transformer according to the system of this invention will begin to diminish with each succeeding applied waveform until, after several applications of the waveform, significantly reduced transient currents are observed.

Figure 7:
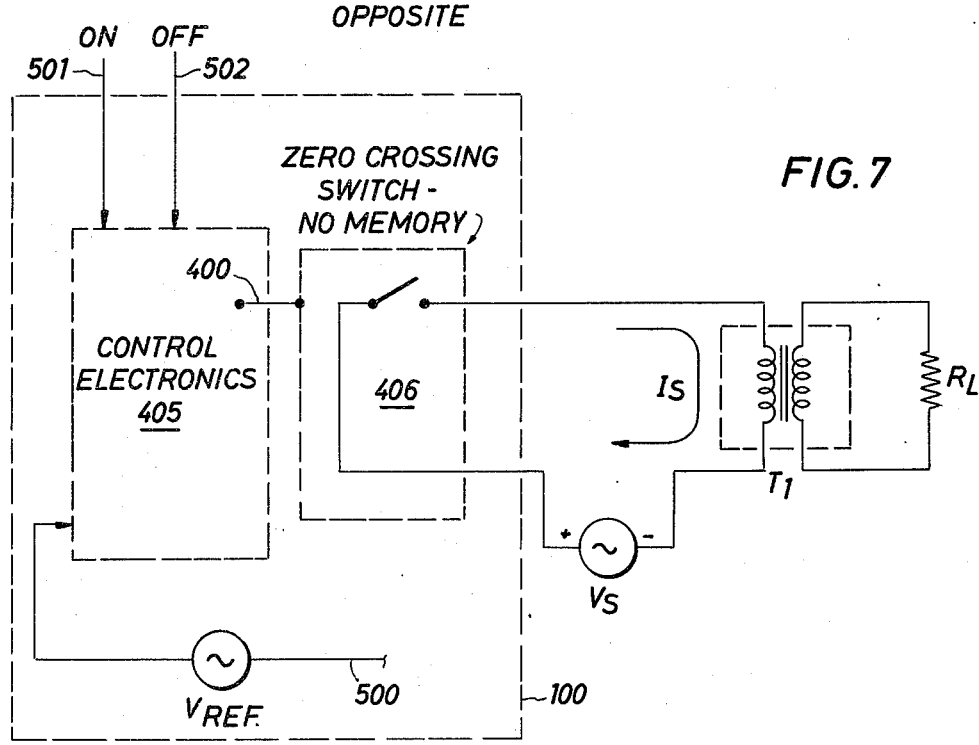
FIG. 7 illustrates the preferred embodiment of the invention comprising a zero crossing switch with no memory with control electronics to insure that sequences of alternating current waveforms illustrated in FIG. 6 are applied to the iron-core transformer.

FIG. 7 schematically indicates the functional aspects of the switching apparatus of the nuclear magnetism logging system of the invention. The A.C. voltage source, Vs, is connected to an ironcore transformer T1 via a simple zero crossing switch 406. A zero crossing switch having no memory is a switch, responsive to a control signal, which opens or closes according to whether an applied waveform is at zero amplitude, but it is not responsive to the polarity of the waveform before a zero amplitude is sensed. The control electronics circuit 405 generates a control signal on lead 400 which activates switch 406. The control electronics circuit 405 is responsive to a reference voltage in phase with the present current Is waveform sequence via lead 500, on/off signals via leads 501, 502 and to the opening and closing polarities of the immediately preceding applied waveform.

Figure 8:
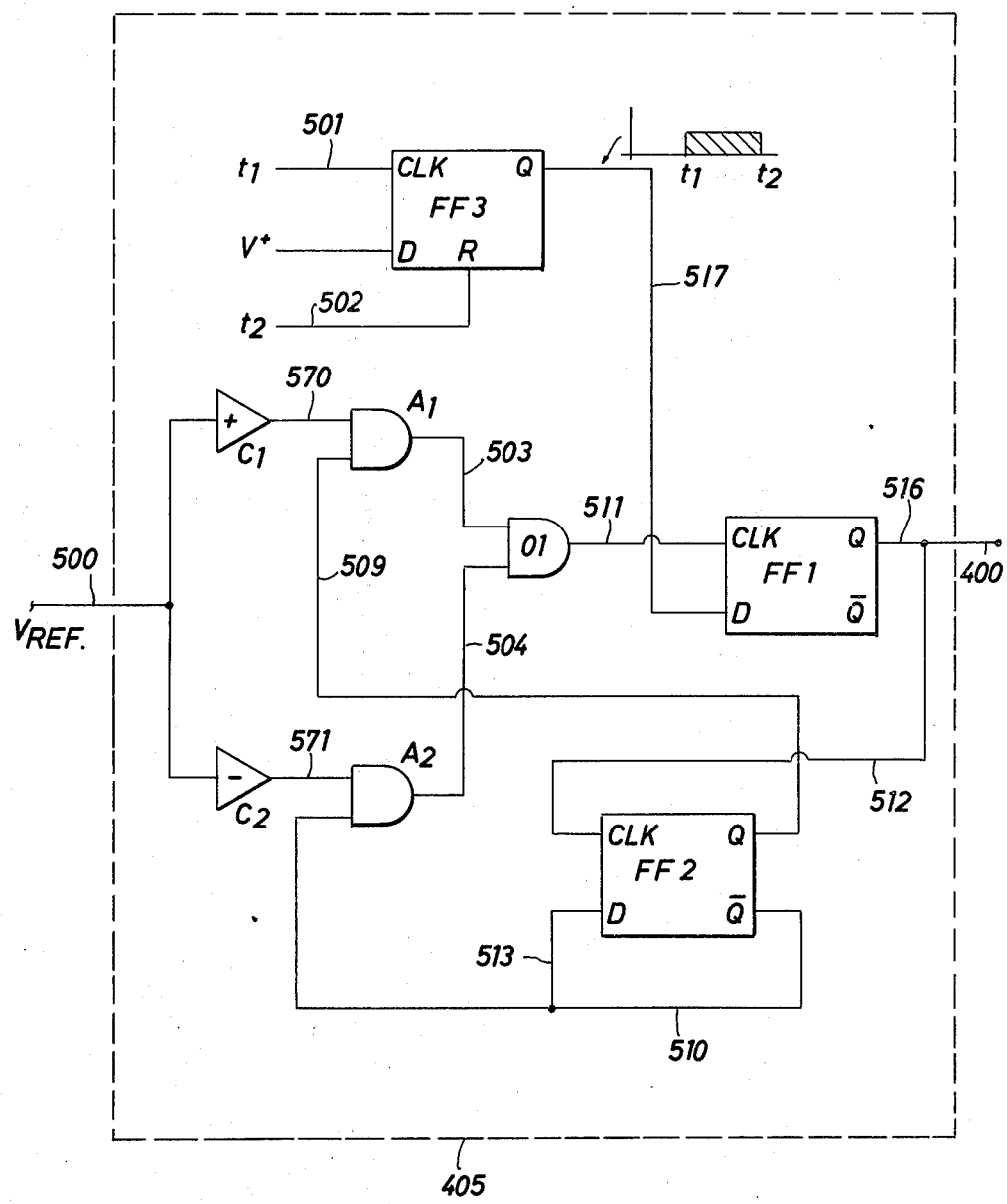
FIG. 8 illustrates the control electronics used in the preferred embodiment of the invention.

FIG. 8 illustrates the details of the control electronics circuit 405. The reference waveform signal Vref, which is in phase with current Is, is applied on lead 500 to two comparator circuits, a positive comparator C1 and a negative comparator C2. The outputs of comparators C1 and C2 are applied via input leads 570, 571 of AND gates A1 and A2. Another lead to each of AND gates A1 and A2 is applied respectively from the Q and $\overline{Q}$ outputs of flip-flop FF2 via leads 509, 510. Flip-flop FF2 controls which of the polarities of waveform Vref (Is) will control the output of lead 400 which is applied to the zero crossing switch. NOR gate 01 applies an output pulse to the CLK input of flip-flop FF1 via lead 511 as a function of the polarity present on lead 500 as sensed by comparators C1 and C2. The present state of flip-flop FF2 depends on the turn-on and turn-off polarities of the immediately previous applied waveforms as will be explained below.

A high voltage pulse at time $t_1$ is applied to the CLK input of FF3 on lead 501 at the turn-on time; a high voltage pulse at time $t_2$ is applied to the R input of FF3 on lead 502 at the turn-off time. The Q output of FF3 is driven high at time $t_1$. The following clock pulse on lead 511 transfers this high voltage on date input D of FF1 to the Q output, driving lead 400 high. The Q output of FF3 is driven low at time $t_2$ and is applied to the data input D of flip-flop FF1. When a pulse on lead 511 to the CLK input of flip-flop FF1 is received, the low voltage on D is transferred to the Q output of FF1 on lead 516 causing the control signal on lead 400 to be removed.

When the Q output of flip-flop FF1 is driven high, the high voltage is applied to the CLK input of toggle flip-flop FF2. As a result, the output conditions of FF2 change state and remain in the changed state until new voltage is received. Thus, when the Q output of FF1 goes high during the enable time between $t_1$ and $t_2$, flip-flop FF2 changes state. When the Q output of FF1 goes low, the output states of Q and $\overline{Q}$ of FF2 does not change state, because there is no clock voltage at CLK to toggle FF2. Thus, the state of FF2 changes only once with each application of an A.C. waveform.

Figure 9:
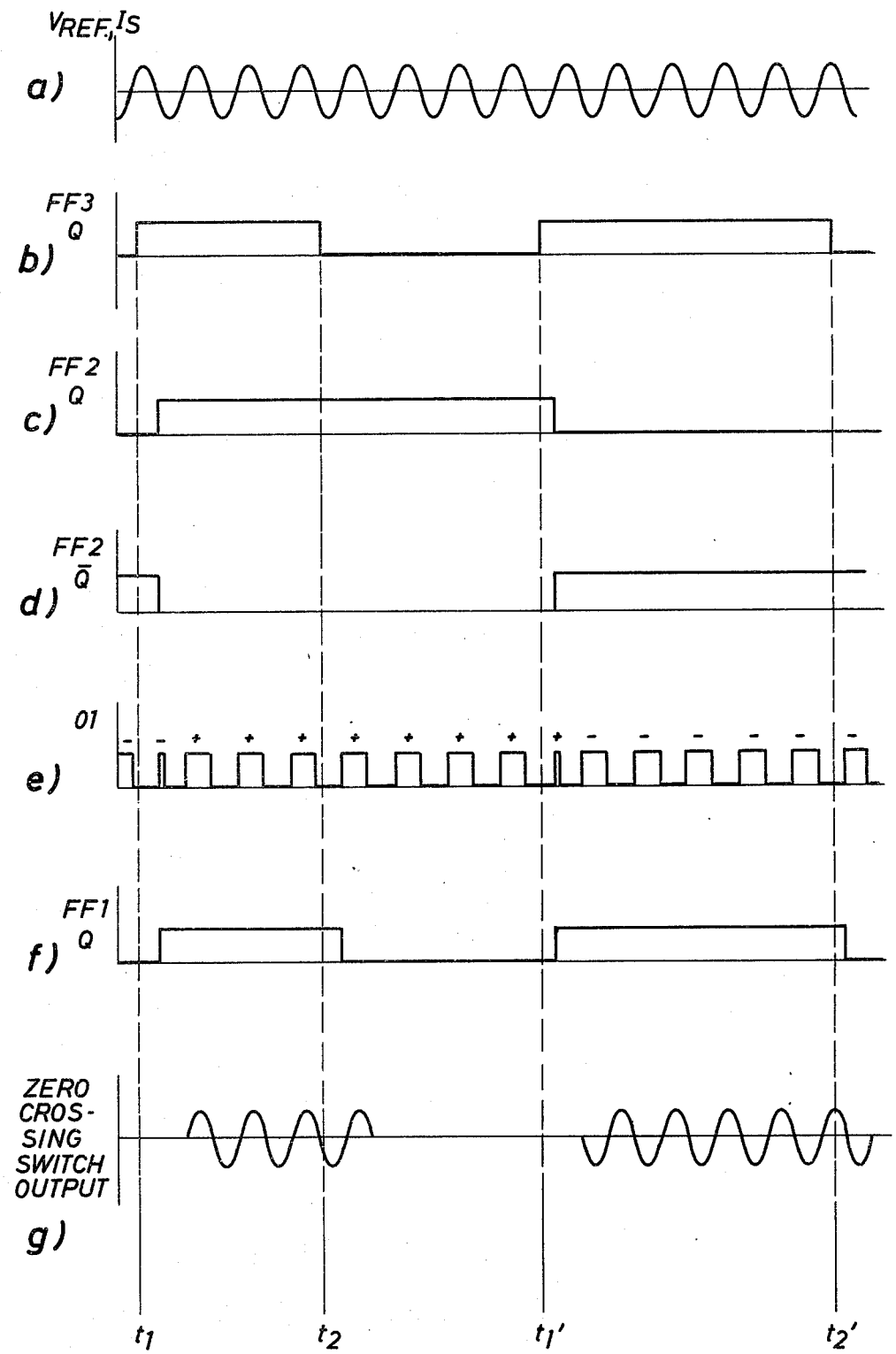
FIG. 9 illustrates waveforms at selected points in the control electronic circuit during typical operation of the invention.

The operation of the control electronics circuit 405 is explained with reference to FIG. 9 which shows illustrative waveforms as a function of time at various points in the circuit. Curve (a) of FIG. 9 illustrates a typical A.C. voltage or current sinusoidal waveform, which may be a 60 Hz voltage. It is assumed that the initial state of FF2 causes Q of FF2 to be low, $\overline{Q}$ of FF2 to be high. When the Q output of FF3 goes high, that high voltage at the FF1 D input via lead 517 is not transferred to the Q output of FF1 until the next pulse appears at the output of OR gate 01. Once the negative going waveform of Vref (Is) produces an output at OR gate 01, the high input on D of FF1 is closed to the Q output of FF1 thereby driving the Q output of FF1 high and changing the output state of FF2. The Q output of FF1 at lead 400 is applied to a zero crossing switch which applies the output waveform Vref to the iron-core transformer load on the next zero crossing of Vref.

Because the output of flip-flop FF2 changes state when the output of FF1 goes high, the OR gate 01 output is high when voltage Vref is positive. When the Q output of FF3 goes low at t2, the low voltage at the data D input of FF1 is clocked to the Q output of FF1. When the Q output of FF1 goes low via control lead 400, the zero crossing switch disconnects voltage Vs from the iron-core transformer load on the next zero crossing as illustrated in curve (h) of FIG. 9.

The output of FF2 does not change state when the output of FF1 goes low as explained above and illustrated in curves (c), (d) and (f). As a result, the pulses from OR gate 01 are in synchronism with the positive polarity half-cycles of voltage Vref. When the Q output of FF3 is driven high again for a subsequent application of the voltage Vs to the iron-core transformer (e.g., at time $t_1'$), the high voltage at the OR gate 01 output clocks the date input from Q of FF3 to the FF1 Q output, driving it high. This changes the state of FF2. The zero crossing switch, now enabled via lead 400, applies the voltage Vs to the load on the next zero crossing, which starts the waveform with a negative polarity, opposite to the stopping polarity of the previously applied waveform.

Because $\overline{Q}$ of FF2 is now high, negative polarity half-cycles of voltage Vref produce pulses at the OR gates 01 output as illustrated at curve (e) of FIG. 9. When the output Q of FF3 is removed, the Q output of FF1 is driven low because the removal of the output Q of FF3 occurs when the OR gate 01 output is high in response to the negative polarity half cycle of Vref. Consequently FF1 Q goes low and the zero crossing switch disconnects the voltage waveform Vs at $t_2'$ as illustrated in curve (g) of FIG. 9.

What is claimed is:

1. In a nuclear magnetism logging system, a method for applying a sequence of alternating current waveforms from a surface source of alternating current power to a load, each waveform in the sequence starting and stopping with substantially zero amplitude, the method comprising the steps of:
   memorizing the starting and stopping polarity of the immediately preceding waveform in the sequence, and
   starting and stopping the present waveform in the sequence of waveforms with polarities opposite to the recorded starting and stopping polarities of said immediately preceding waveform in the sequence.

2. The method of claim 1 wherein said load is a surface iron-core transformer electrically connected to a downhole load.

3. The method of claim 1 wherein the starting and stopping polarity of any waveform in the sequence is the same, but opposite in polarity to the starting and stopping polarities of the immediately preceding waveform in the sequence.

4. The method of claim 1 wherein the number of half-cycles in each waveform is an odd number.

5. In a nuclear magnetism logging system, a method of applying a sequence of alternating current waveforms from a surface source of alternating current power to a load, each waveform in the sequence starting and stopping at substantially zero amplitude, the method comprising the steps of,
   starting the present waveform with a polarity opposite stopping polarity of the immediately preceding waveform, and
   stopping the present waveform after an odd number of half-cycles of the waveform have been applied to the load.

6. A nuclear magnetism logging system comprising, a surface unit having,
   a source of alternating current power,
   circuit means for applying a sequence of alternating current waveforms from said source of alternating current power source to a first transformer, each waveform in the sequence starting and stopping with substantially zero amplitude, said circuit means having, means for memorizing the starting and stopping polarity of the immediately preceding waveform in the sequence, and means for starting and stopping the present waveform in the sequence of waveforms with polarities opposite that of the memorized starting and stopping polarities of the immediately preceding waveform in the sequence, and a downhole sonde having, a second transformer, the primary coil of said second transformer being electrically connected to the secondary coil of said first transformer in said surface unit, a rectifier circuit having alternating current input connections and direct current output connections, the input connections being connected to the secondary coil of said second transformer.

a polarizing-receiving coil, and switching means for connecting said polarizing-receiving coil to the output connection of said rectifier circuit during a certain polarizing period of time.

7. The nuclear magnetism logging system of claim 6 further comprising, a receiving amplifier in said downhole sonde connected to said polarizing-receiving coil via said switching means during certain receiving periods of time, receiving means in said surface unit electrically connected to said receiving amplifier for receiving the output signals from said receiving amplifier, and recording means for storing said output signals received by said receiving means.

8. The nuclear magnetism loggin system of claim 7 further comprising, timing means for causing said switching circuit to connect said polarizing-receiving coil to said rectifier circuit during certain polarizing periods of time and to said receiving amplifier during certain receiving periods of time.

9. Apparatus for a nuclear magnetism logging system for applying a sequence of alternating current waveforms from a surface of alternating current power to an iron-core transformer, each waveform in the sequence starting and stopping at substantially zero amplitude, comprising, means for starting the present waveform with a polarity opposite to the stopping polarity of the immediately preceding waveform in the sequence, and means for stopping the present waveform after an odd number of half-cycles of the waveform have been applied to the load.

10. The apparatus of claim 9 wherein the time of application of each waveform in the sequence is short compared to the transient response time required for said iron-core transformer to reach steady state conditions.

11. Apparatus for a nuclear magnetism logging system for applying waveforms to a load comprising, a source of alternating current voltage, a source of a waveform enable signal, circuit means for generating a polarity signal corresponding to the stopping polarity of the immediately preceding waveform in the sequence, circuit means responsive to the alternating current voltage, responsive to said previous waveform stopping polarity signal, and responsive to said waveform enable signal for generating a control signal during the time said waveform enable signal is present and the polarity of said alternating current voltage is the same as the previous waveform stopping polarity, and for removing said control signal after the simultaneous occurrence of the removal of said waveform enable signal and the occurrence of the polarity of said alternating current voltage being opposite to said previous waveform stopping polarity, and zero crossing switch means responsive to said control signal for connecting said alternating current voltage source to said load when the voltage from said source passes through zero amplitude to a polarity opposite that of said previous waveform stopping polarity, and for disconnecting said alternating current voltage source from said load when the voltage from said alternating current voltage source passes through zero amplitude from a polarity opposite that of said previous waveform stopping polarity.

12. A surface unit adapted to provide sequences of alternating current power to a downhole sonde in a nuclear magnetism logging system, the surface unit comprising, a source of alternating current power, an iron-core transformer having input terminals and output terminals, the output terminals of said transformer adapted for connection to said downhole sonde, circuit means for applying a sequence of alternating current waveforms from said source of alternating current power source to said input terminals of said transformer, each waveform in the sequence starting and stopping with substantially zero amplitude, said circuit means having, means for memorizing the starting and stopping polarity of the immediately proceding waveform in the sequence, and means for starting and stopping the present waveform in the sequence of waveforms with polarities opposite that of the immediately preceding waveform in the sequence.

* * * * *